United States Patent [19]
Turri et al.

[11] Patent Number: 5,910,614
[45] Date of Patent: Jun. 8, 1999

[54] PROCESS FOR PREPARING PERFLUOROPOLYETHERS

[75] Inventors: Stefano Turri, Brugherio; Claudio Tonelli, Concorezzo; Carlo Pogliani, Cesano Maderno, all of Italy

[73] Assignee: Ausimont S.p.A., Milan, Italy

[21] Appl. No.: 08/903,060

[22] Filed: Jul. 30, 1997

[30] Foreign Application Priority Data

Aug. 2, 1996 [IT] Italy .................................. MI96A1672

[51] Int. Cl.⁶ ............................ C07C 43/11; B01D 16/08
[52] U.S. Cl. ............................ 568/615; 568/621; 210/656
[58] Field of Search ..................................... 568/615, 621; 210/656

[56] References Cited

U.S. PATENT DOCUMENTS

| | | |
|---|---|---|
| 2,242,218 | 5/1941 | Auer . |
| 3,665,041 | 5/1972 | Sianesi et al. . |
| 3,715,378 | 2/1973 | Sianesi et al. . |
| 3,766,251 | 10/1973 | Caporiccio et al. . |
| 3,810,874 | 5/1974 | Mitsch et al. . |
| 5,246,588 | 9/1993 | Tonelli ..................................... 210/656 |
| 5,262,057 | 11/1993 | Tonelli et al. . |

FOREIGN PATENT DOCUMENTS

| | | |
|---|---|---|
| A148482 | 7/1985 | European Pat. Off. . |
| A239123 | 9/1987 | European Pat. Off. . |
| 538 827 A2 | 4/1993 | European Pat. Off. . |
| 538 828 A2 | 4/1993 | European Pat. Off. . |
| WO 95/29003 | 11/1995 | WIPO . |

OTHER PUBLICATIONS

Makromol. Chem. 193, 2211, (1942).
J. Pol. Sci., Part A: Pol. Chem. 33, p. 1615 (1995).
Patent Abstracts of Japan; JP 61 25166; Nov. 11, 1986.

*Primary Examiner*—Gary Geist
*Assistant Examiner*—Jean F. Vollano
*Attorney, Agent, or Firm*—Nikaido Marmelstein Murray & Oram, LLP

[57] ABSTRACT

Separation process of bifunctional macromolecules having hydroxylic termination from non functional and/or monofunctional macromolecules having hydroxylic termination contained in admixture in perfluoropolyoxyalkylenes (I) comprising the following phases:

addition of the macromer (I) to a suspension of stationary phase in polar solvent, said stationary phase being formed by a compound containing sites and/or active groups, capable of establishing bonds or interactions of polar type, or hydrogen bonds, with the hydroxylic terminals of the perfluoropolyoxyalkylenes contained in the mixture of formula (I), the macromer/stationary phase ratio ranging from 2/3 to 1/1 w/w; solvent/(stationary phase+macromer) ratio ranging from 0.8/1 to 1.5/1 v/w; evaporation of the solvent, until obtainment of an incoherent and dry powder;

first extraction with low polarity fluorinated solvent and separation of the phases by filtering;

second extraction of the stationary phase with polar hydrogenated solvent, and separation of the phases by filtering;

the macromer fraction having high bifunctionality degree being obtained by concentration of the liquid phase after second extraction, i.e. after removal of the solvent.

11 Claims, No Drawings

PROCESS FOR PREPARING PERFLUOROPOLYETHERS

The present invention relates to a method for separating bifunctional macromolecules having hydroxylic termination from non functional and/or monofunctional macromolecules having hydroxylic termination contained in admixture in perfluoropolyoxyalkylenes having the structure:

$$X_1\text{—O—Rf—Y} \qquad (I)$$

wherein

Rf: perfluoropolyoxyalkylenic chain having number average molecular weight 500–10,000 comprising units such as $(CF_2CF_2O)$, $(CF_2O)$, $(C_3F6O)$, $(CF_2(CF_2)_z CF_2O)$, $—CR_4R_5CF_2CF_2O—$ wherein $R_4$ and $R_5$ are equal to or different from each other and seleted from H, Cl or perfluoroalkyl, for instance having 1–4 C atoms, said units being randomly distributed along the chain;

z is an integer=1 or 2;

$X_1$, Y: equal to or different from each other, functional terminals of the type $—CFXCH_2OH$, X is F or $CF_3$, non functional such as $—CF_3$, $—CF_2Cl$, $—CF_2CF_2Cl$, $—CF_2Br$, $—CF_2CF_3$.

The perfluoropolyoxyalkylenes indicated above are known and described in the patents U.S. Pat. Nos. 3,766, 251, 3,810,874 and European patent application 148482, or Makromol. Chem. 193, 2211, 1942 and J. Pol. Sci.: Part A: Pol. Chem. 33, 1615, 1995.

The products industrially available consist of mixtures of monofunctional and bifunctional species, and generally also contain smaller amounts of non functional species. The average functionality of the mixture can be determined for instance by $^{19}$F-NMR (see the characterization in the examples) and the result is generally comprised between 1.90 and, at the most, 1.98 functional terminals per molecule.

In particular the product commercially known as FOMBLIN® Z DOL having the following structure:

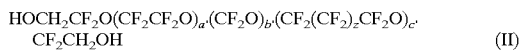
$$HOCH_2CF_2O(CF_2CF_2O)_{a'}(CF_2O)_{b'}(CF_2(CF_2)_zCF_2O)_{c'}\text{-} CF_2CH_2OH \qquad (II)$$

with a'/b'=0.5–1.5, the units with index c' are present in amounts in the range of 1% by weight on the total weight of the product, z has the meaning indicated above, the content in bifunctional species of about 90–95% by weight on the total weight of the product, the remaining species being formed by monofunctional or non functional perfluoropolyoxyalkylenes.

The perfluoropolyoxyalkylene diol (II) can be utilized as macromonomer for preparing polyurethane copolymers, polyesters and polyethers, both thermoplastic, linear and crosslinked.

In the case of linear polymers the presence of monofunctional species in the monomeric mixture prevents the formation of high molecular weights, with consequent deterioration of the mechanical properties of the final material.

Also in the case of crosslinked polymers the presence of monofunctional species determines an irregular formation of the tridimensional network, with poor chemical and mechanical resistance of the final product.

It is therefore of high industrial interest to have avalaible monomers and macromonomers having a high bifunctionality degree.

Generally, the Applicant had previously discovered a process to obtain the separation of bifunctional species from species of non functional and monofunctional macromolecules which form the perfluoropolyoxyalkylenes of formula (I) by a column chromatography a method (see U.S. Pat. No. 5,262,057). Such method requires the use of a polar stationary phase, and a couple of solvents of different polarity and chemical nature, such as trichlorotrifluoroethane (CFC 113) and an alcohol, or ester or ketone. The method requires large amounts of solvent, therefore the concentration at the end of the process is of about 3–5 g of fluorinated polymer per liter of total solvent. The method requires moreover the use of chromatographic columns having a relatively high number of plates, i.e. the equipment must foresee a length of the silica gel bed much greater than its diameter.

These technological bonds can make difficult the treatment of significant amounts (10–1000 kg) of fluorinated macromer since considerable volumes of solvents and the utilization of more chromatographic columns in parallel are necessary. This implies on one hand problems related to the utilization, removal and recovery of the solvents, and on the other hand the planning of a complex automated plant for the separation and for the recovery of the solvents. This leads to remarkable investment costs and consequently to high costs for units of bifunctional product obtained.

The Applicant has surprisingly and unexpectedly found a method of purification by extraction, also discontinuously, suitable to obtain remarkable amounts of polymer having a high bifunctionality degree and without the disadvantages indicated above with a reduced use of solvents, optionally also not belonging to the CFC class. This is a further advantage since CFCs as solvents are prohibited according to the international rules in force in the respective countries.

The steps of the new process are the following:

addition of the macromer (I) to a suspension of stationary phase as defined below, for instance silica gel, in polar solvent, for instance ketones, esters, alcohols or mixtures thereof with low polarity fluorinated solvents, macromer/stationary phase ratio from 2/3 to 1/1 w/w, solvent/(stationary phase+macromer) ratio from 0.8/1 to 1.5/1 v/w;

evaporation of the solvent, preferably at 50–80° C., optionally under vacuum, until a loose and dry powder is obtained;

first extraction with low polarity fluorinated solvent, for instance hexafluoro-xylene, perfluoroheptane, etc. can be mentioned and separation of the phases by filtering. 1.5–4 liters of solvent for Kg of charged stationary phase are for instance used;

second extraction of the stationary phase with polar hydrogenated solvent, for instance alcohols, acetone, ethyl acetate, preferably at 50–60° C., and separation of the phases by filtering. 1–2 liters of solvent for Kg of charged stationary phase are generally used.

The macromer fraction having high bifunctionality degree is obtained by concentration of the liquid phase after the second extraction, i.e. after the removal of the solvent.

It has been surprisingly found that the method by extraction, notwithstanding the impossibility to obtain a sufficient number of plates with establishment of adsorption/desorption equilibria, allows the high yields of product having hydroxylic functionality >1.99 in short times and with a process having a high productive potentiality and with a reduced employment of solvent.

In short the process of the invention produces fluorinated macrodiols having high purity degree and hydroxylic bifunctionality (>1.99 from $^{19}$F-NMR), by a process with an easier scale-up with respect to the chromatographic process in the name of the Applicant described above in terms of higher amount of treatable product, reduced amount of used stationary phase, and reduced volumes of solvent.

The mixtures of perfluoropolyethers which can be treated according to the process of the present invention preferably comprise the following repeating units:

1) —$CR_4R_5CF_2CF_2O$— wherein $R_4$ and $R_5$ are equal to or different from each other and selected from H, Cl or perfluoroalkyl, for instance 1–4 C atoms, said units inside the fluoropolyoxyalkylenic chain being linked with each other as follows:

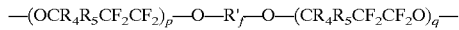

wherein $R'_f$ is a fluoroalkylenic group, for instance from 1 to 4 C, or perfluoropolyether containing the units of class 3) with termination $CF_2O$, p and q are integers from 0 to 200, and p+q is at least 1 and such that the molecular weight is that indicated above.

2) —$C_3F_6O$—, optionally in the presence of units —CFXO—, said units being linked each other inside the fluoropolyoxyalkylenic chain as follows:

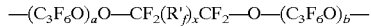

wherein $R'_f$ has the meaning indicated above, x is 0 or 1, a and b are integers and a+b is at least 1 and such that the molecular weight is that indicated above, —$C_3F_6O$— can be —$CF(CF_3)CF_2O$— or —$CF_2CF(CF_3)O$—;

3) —$(C_2F_4O)_{a'}(CFXO)_{b'}(CF_2(CF_2)_zCF_2O)_{c'}$—
wherein a' and b' are integers such that the molecular weight is within the indicated range, a'/b' ranges between 5 and 0.3, preferably between 2.7–0.5, the units with index c' are present in amounts in the range of 1% by weight, z has the meaning indicated above, X is equal to F, $CF_3$.

The indicated fluoropolyethers are obtainable with the processes well known in the art for instance patents U.S. Pat. No. 3,665,041, 2,242,218, 3,715,378, 3,766,251, European patents EP 239,123, EP 148,482 and the publications indicated above. The functionalized fluoropoiyethers with hydroxylic termination are obtained for instance according to patents EP 0148482, U.S. Pat. No. 3,810,874. All these patents and publications are incorporated herein by reference.

The preferred compounds are those of class 3) having the general formula II indicated above.

The stationary phase is formed by a compound containing sites and/or active groups, capable of establishing bonds or interactions of polar type, or hydrogen bonds, with the hydroxylic terminals of perfluoropolyoxyalkylenes contained in the mixture of formula (I). The stationary phase preferably contains, as sites or active groups, free hydroxylic groups which in the case of silica are represented by silanol groups.

Examples of preferred compounds as stationary phase for the purposes of the present invention are the active alumina, silica gel, magnesium oxide, Al and Mg silicates, such as for instance FLORISIL®.

Preferably such compounds process average pore diameters of lower than 200 Å.

The silica gel with porosity from 60 to 100 Å, and with a granulometry from 70–230 mesh to 200–400 mesh, is preferred.

The partially or totally fluorinated solvents having low polarity must be capable of dissolving perfluoropolyethers of formula (I) at room temperature in amounts of at least 50 g/l, preferably 100 g/l.

Such fluorinated solvents are for instance trichlorotrifluoroethane, perfluoropolyethers having low molecular weight and low viscosity free from functional groups, for instance GALDEN® HT, perfluoroalkanes, for instance perfluoroheptane, mono- and dihydroperfluoropolyethers having low molecular weight and low viscosity, for instance H-GALDEN®, hydrofluorocarbons HFC, Hydrochlorofluorcarbons HCFC, fluoroaromatics such as trifluorotoluene, hexafluoroxylenes isomers, perfluorobenzene.

All the organic solvents, miscible with the solvents having low polarity mentioned above, endowed also with acid or basic functions and having value of eluotropic force, referred to the silica, $\epsilon > 0.30$, and preferably $> 0.4$, are utilizable as polar solvents.

Exemplary polar solvents are, for instance, alcohols, ketones, carboxylic acids, nitriles, amides, esters, alkylsulphoxides. As an example are mentioned: methanol, ethanol, propanol, methyl or ethyl acetate, acetonitrile, dimethylformamide, acetone, methylethylketone.

The total volume of solvent utilized is such as to determine a concentration of macromer in the purification process in the range of 50–100 g/liter with respect to 3–5 g/liter of the chromatographic process.

The yield in bifunctional product is at least 50% by weight, up to 80% by weight.

The chemical-physical characterization of the products is carried out as follows:

Characterization NMR

The values of molecular weight composition and hydroxylic functionality of the compounds of formula (I) are obtained by spectroscopy $^{19}$F-NMR. An example of the procedure to characterize the compounds of formula (II) is as follows; a Varian XL-200 spectrometer at 188.22 MHZ was used:

The $^{19}$F-NMR spectra are obtained on neat samples. The typical acquisition parameters are:

| | |
|---|---|
| spectral width | 25,000 Hz |
| flip angle | 12° |
| acquisition time | 0.5 sec |
| range among the impulses | 0.5 sec |
| accumulation number | 1000. |

All the values of chemical shift are referred to the group —$OCF_2CF_2CF_2O = -125.82$ ppm, determined in a separate experiment.

The number average molecular weight Mn is given by the following equation:

$$Mn = 2 \cdot M/(F+I)$$

wherein:

$$M = 66 \cdot [A(I) + A(II) + A(III)] + 116 \cdot [A(IV) + A(V) - A(XVIII)]/2 + 166 \cdot [A(IX)] + 216 \cdot [A(VIII)]/2 + 77 \cdot [A(XIV) + A(XV)]/1.5 + 93.5 \cdot [A(XVI) + A(XVII)] + 143.5 \cdot [A(XVIII)] + 89 \cdot [A(X) + A(XI)] + 103 \cdot [A(XIX) + A(XX)]$$

$$F = A(X) + A(XI) + A(XIX) + A(XX)$$

-continued $$I = A(\text{XIV})/1.5 + A(\text{XV})/1.5 + A(\text{XVI}) + A(\text{XVII}) + A(\text{XVIII})$$

wherein A(i) represents the integrated intensity signal corresponding to the specific assignment of Table 1. The equivalent weight is given by the following equation:

equivalent weight=$M/F$ wherein M and F have the meaning defined above.

The terminal groups XIV, XV, XVI, XVII and XVIII are not functional: since these inert groups have low concentration, the number of species having both terminals non-functional, is considered insignificant. The content of bifunctional species is then calculated by the following equation:

% of bifunctional species=$[(F-I)/(F+I)]\cdot 100$.

The hydroxylic average functionality is given by:

functionality=$2F/(F+I)$.

The composition of the macromer (II) is given as the ratio between chain units $C_2F_4O/CF_2O$.

$$\frac{C_2F_4O}{CF_2O} = \frac{[A(\text{IV}) + A(\text{V}) - A(\text{XVIII})]}{2\cdot[A(\text{I}) + A(\text{II}) + A(\text{III})]}$$

TABLE 1

$^{19}$F-NMR assignments

| Signal | Chemical Shift | Group | |
|---|---|---|---|
| I | −52.1 | —OCF$_2$CF$_2$OC$\underline{F}_2$OCF$_2$CF$_2$O— | |
| II | −53.7 | —OCF$_2$CF$_2$OC$\underline{F}_2$OCF$_2$OCF$_2$— | |
| III | −55.4 | —CF$_2$OCF$_2$OC$\underline{F}_2$OCF$_2$OCF$_2$— | |
| IV | −89.1 | —OCF$_2$CF$_2$OC$\underline{F}_2$CF$_2$OCF$_2$— | |
| V | −90.7 | —CF$_2$OCF$_2$OC$\underline{F}_2$CF$_2$OCF$_2$— | |
| VIII | −125.8 | —OCF$_2$C$\underline{F}_2$C$\underline{F}_2$CF$_2$O— | |
| IX | −129.7 | —OCF$_2$C$\underline{F}_2$CF$_2$O— | |
| X | −81.3 | —OCF$_2$CF$_2$OC$\underline{F}_2$CH$_2$OH | |
| XI | −83.3 | —OCF$_2$OC$\underline{F}_2$CH$_2$OH | |
| XIV | −56.3 | —OCF$_2$CF$_2$OC$\underline{F}_3$ | |
| XV | −58.0 | —OCF$_2$OC$\underline{F}_3$ | |
| XVI | −27.7 | —OCF$_2$CF$_2$OC$\underline{F}_2$Cl | |
| XVII | −29.3 | —OCF$_2$OC$\underline{F}_2$Cl | |
| XVIII | −74.5 | —OCF$_2$C$\underline{F}_2$Cl | |
| XIX | −78.3 | —OCF$_2$OC$\underline{F}_2$COOR | R = H, CH$_3$ |
| XX | −80.2 | —OCF$_2$CF$_2$OC$\underline{F}_2$COOR | R = H, CH$_3$ |

With a similar procedure the functionality, composition and molecular weight of perfluoropolyoxyalkylenes having general structure as in (I), can be calculated taking into account the different values of Chemical Shift.

The following examples are given for illustrative purposes and are not limitative of the scope of the present invention.

EXAMPLE 1

In a 60 liter reactor equipped with mechanical stirring and reflux valve 6 kg of silica gel Merck 9385 are stirred in 10 liters of mixture Delifrene/Methanol 9/1 by volume at room temperature. 5 Kg of PFPE diol of formula II (Z DOL) having Mn=1200, Mw/Mn=1.4 and a'/b'=1.20 and the unit c' being present in amounts in the range of 1% by weight, hydroxylic functionality 1.98, are added. After 30 minutes the suspension is dried, first under ambient pressure at 50° C., then under vacuum (0.1 mmHg) at 80° C. until the fine powder appears dry and incoherent.

In the same reactor are introduced 40 liters of Delifrene® LS (1,1,2-trichlorotrifluoroethane) and the suspension is kept under stirring at room temperature for 2 hours. The suspension is then filtered on a glass wool panel. The solid phase (charged silica) is introduced again in the reactor, added with 20 liters of methanol and reflux heated under stirring for one hour. The suspension is filtered again and the methanolic phase evaporated, giving 2.80 Kg of oil (yield 56% by weight) which at the $^{19}$F-NMR and GPC analysis resulted to be Z DOL having number average molecular weight Mn=1,000; Mw/Mn=1.2 (Mw=weight average molecular weight), a'/b'=1.20 and hydroxylic functionality 1.995, the c' units being in the range of 1% by weight.

EXAMPLE 2

With the same procedure of the preceding example, a fine powder is prepared by starting from 4 kg of a sample of Z DOL (formula II) having Mn=1,050, Mw/Mn=1.1, ratio a'/b'=0.77 and hydroxylic functionality 1.94, the c' units being about 1% by weight, 6 Kg of silica gel Merck 9385 and 12 liters of mixture Delifrene/methanol 9/1 v/v. The fine powder is extracted a first time with 30 liters of Delifrene, filtered, extracted again with 15 liters of methanol and filtered again.

The methanolic phase is dried and 3.32 Kg of oil (yield 83% by weight) are obtained which at the NMR and GPC analysis result to be Z DOL (formula II) with Mn=1,000, Mw/Mn=1.1; a'/b'=0.77 and hydroxylic functionality 1.991, the c' units being about 1% by weight.

EXAMPLE 3

With the modalities of the preceding examples a fine powder is prepared formed by 4 Kg of Z DOL (formula II) having Mn=1,000, Mw/Mn=1.3; a'/b'=1, the c' units being about 1% by weight and hydroxylic functionality 1.97 with 6 Kg of silica and 13 liters of acetone. The fine powder is treated with 20 liters of trifluorotoluene at 30° C., filtered, extracted again with 15 liters of acetone at 50° C. and filtered again.

By evaporation of the acetone phase 2.2 Kg of oil (yield 55% by weight) are obtained which at the analysis resulted to be Z DOL (formula II) with Mn=950, Mw/Mn=1.1; a'/b'=1 and hydroxylic functionality 1.993, the c' units being about 1% by weight.

EXAMPLE 4

The preceding example is repeated, but by using 1–3 hexafluoroxylene instead of trifluorotoluene.

2.32 Kg (yield 58% by weight) of Z DOL (formula II) are obtained having Mn=940, Mw/Mn=1.1; a'/b'=1, the c' units being about 1% by weight and hydroxylic functionality 1.992.

EXAMPLE 5

One operates as in the preceding example, but using perfluoroheptane instead of hexafluoroxylene.

2 Kg (yield 50% by weight) of Z DOL (formula II) are obtained having Mn=900, Mw/Mn=1.1; a'/b'=1, the c' units being about 1% by weight and hydroxylic functionality 1.996.

EXAMPLE 6

In a 1000 liters steel reactor a fine powder of 77 kg of silica gel is prepared in 154 liters of mixture Delifrene/ methanol 9/1 v/v and 70 Kg of Z DOL (formula II) having Mn=1,000, Mw/Mn=1.2; a'/b'=1.20, the c' units being about 1% by weight and hydroxylic functionality 1.98.

The silica is extracted with 500 liters of Delifrene, filtered and extracted again with 210 liters of methanol. After filtering, the methanolic phase is evaporated and 40 Kg (yield 57% by weight) of Z DOL (formula II) having Mn=950, Mw/Mn=1.1; a'/b'=1.2, the c' units being about 1% by weight and hydroxylic functionality 1.996, are obtained.

EXAMPLE 7

In a 10 liter reactor a fine powder is prepared according to the procedure of the preceding examples consisting of 4 Kg of a sample of Z DOL (formula II) having Mn=2,500, Mw/Mn=1.5, ratio a'/b'=1.2, the c' units being about 1% by weight and hydroxylic functionality 1.95; 6 Kg of silica gel and 12 liters of mixture Delifrene/methanol 9/1 v/v.

The powder is extracted with 30 liters of Delifrene, filtered, extacted again with 15 liters of mixtures methanol/Delifrene 9/1 at 50° C. and filtered again. By evaporation of this last phase, 2.4 Kg (yield 60% by weight) of Z DOL (formula II) are obtained having Mn=2,200, Mw/Mn=1.2; a'/b'=1.1, the c' units being about 1% by weight and hydroxylic functionality 1.995.

EXAMPLE 8

By operating as in Example 3, a fine powder is prepared from acetone consisting of 400 g of Z DOL (formula II) having Mn=1,060; a'/b'=1.2, Mw/Mn=1.3; the c' units being about 1% by weight and hydroxylic functionality 1.98, and 600 g of silica gel.

The silica is extacted again with 1.5 liters of H-GALDEN® perfluoropolyether solvent with —$CF_2H$ terminals, fraction with boiling point 50–60° C.) at room temperature, filtered and then taken again with 1.5 liters of acetone at 50° C. By evaporation of the acetone phase 190 g of Z DOL (formula II) are obtained, having molecular weight 900, Mw/Mn=1.2 and functionality 1.992.

We claim:

1. A process for separating bifunctional macromolecules having hydroxylic termination from non functional and/or monofunctional macromolecules having hydroxylic termination contained in admixture in perfluoropolyoxyalkylenes having the structure:

$$X_1—O—Rf—Y \qquad (I)$$

wherein

Rf is perfluoropolyoxyalkylene chain having a number average molecular weight of 500–10,000 comprising units ($CF_2CF_2O$), ($CF_2O$), ($C_3F_6O$), ($CF_2(CF_2)_zCF_2O$), and —$CR_4R_5CF_2CF_2O$— wherein $R_4$ and $R_5$ are equal to or different from each other and are selected from H, Cl or perfluoroalkyl, said units being randomly distributed along the chain;

z is an integer equal to 1 or 2;

$X_1$ and Y are equal to or different from each other, and are $CFXCH_2OH$ functional terminals, wherein X is F or $CF_3$, non functional terminals —$CF_3$, —$CF_2Cl$, $CF_2CF_2Cl$, —$CF_2Br$, and —$CF_2CF_3$ comprising the following steps:

1) adding the macromer (I) to a suspension of stationary phase in a polar solvent, said stationary phase being commonly employed in chromatographic techniques, and being formed by a compound containing sites or active groups capable of forming bonds or interactions of polar type, or hydrogen bonds, with the hydroxylic terminals of perfluoropolyoxyalkylenes contained in the mixture of formula (I), the macromer/stationary phase ratio ranging from 2/3 to 1/1 w/w; solvent/(stationary phase+macromer) ratio ranging from 0.8/1 to 1.5/1 v/w;

2) evaporating the solvent, until a loose and dry powder is obtained;

3) conducting a first extraction with a low polarity fluorinated solvent and separating the phases by filtering;

4) conducting a second extraction of the stationary phase with a hydrogen-saturated polar solvent and separating the phases by filtering;

5) obtaining the macromer fraction having high bifunctionality degree by concentrating the liquid phase after said second extraction.

2. The process according to claim 1, wherein the evaporation of the solvent preceding said first extraction, step 3 is carried out at 50–80° C., optionally under vacuum, the second extraction, step 4, is carried out at 50–60° C.

3. The process according to claim 1, wherein in step 3 1.5–4 liters of solvent per kg of loaded stationary phase are employed; and in step 4 1–2 liters of solvent per kg of loaded stationary phase are employed.

4. The process according to claim 1 wherein the macromer obtained in step 5 has a hydroxylic functionality greater than 1.99.

5. The process according to claim 1, wherein the mixtures of perfluoropolyethers comprise the following repeating units:

1) —$CR_4R_5CF_2CF_2O$— wherein $R_4$ and $R_5$ are equal to or different from each other and are selected from H, Cl or perfluoroalkyl, said units inside the fluoropolyoxyalkylenic chain being linked to each other as follows:

wherein $R'_f$ is a fluoroalkylenic group, or perfluoropolyether containing the units of 3) set forth below with termination $CF_2O$, p and q are integers from 0 to 200, and p+q is at least 1 and such that the molecular weight is that indicated above, 2) —$C_3F_6O$—, optionally in the presence of units —CFXO—, said units being linked to each other inside the fluoropolyoxyalkylenic chain as follows:

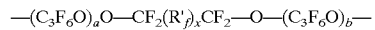

wherein $R'_f$ has the meaning indicated above, x is 0 or 1, a and b are integers and a+b is at least 1 and such that the molecular weight is that indicated above, —$C_3F_6O$— can be —$CF(CF_3)CF_2O$— or —$CF_2CF(CF_3)O$—;

3) —$(C_2F_4O)_{a'}(CFXO)_{b'}(CF_2(CF_2)_zCF_2O)_{c'}$— wherein a' and b' are integers such that the molecular weight is within the indicated range, a'/b' ranges between 5 and 0.3, the units with index c' are present in an amount in the range of about 1% by weight on the total weight of said starting macromer, z has the meaning indicated above, X is equal to F, $CF_3$.

6. The process according to claim 5 wherein the starting macromer has the formula $$HOCH_2CF_2O(CF_2CF_2O)_{a'}(CF_2O)_{b'}(CF_2(CF_2)_zCF_2O)_{c'}CF_2CH_2OH \qquad (II)$$

wherein the ratio a' to b' ranges between 0.5–1.5, the units with the c' index are present in an amount in the range of about 1% by weight based on the total weight of said starting macromer, z has the meaning indicated above, the content of bifunctional species is about 90–95% by weight based on the total weight of said starting macromer, the remaining macromers being formed by monofunctional or non functional perfluoropolyoxyalkylenes.

7. The process according to claim 1, wherein the stationary phase contains, as sites or active groups, free hydroxylic groups which in the case of the silica are represented by silanol groups, active aluminas, silica gels, magnesium oxide, silicates of Al or silicates of Mg.

8. The process according to claim 1 wherein the partially or totally fluorinated solvents having low polarity dissolve the perfluoropolyethers of formula (I) at room temperature in amounts of at least 50 g/l.

9. The process according to claim 8, wherein the partially or totally fluorinated solvents with low polarity are selected among trichlorotrifluoroethane, perfluoropolyethers having low molecular weight and low viscosity free from functional groups, perfluoroalkanes, mono- and dihydroperfluoropolyethers having low molecular weight and low viscosity, hydrofluorocarbons HFC, hydrochlorofluorocarbons HCFC, fluoroaromatics selected from trifluorotoluene, hexafluoroxylenes isomers, perfluorobenzene.

10. The process according to claim 1, wherein the polar solvents are the organic solvents which are miscible with the solvents having low polarity as above mentioned also having acid or basic functions and having eluotropic force value, referred to the silica, $\epsilon > 0.30$, when the stationary phase is silica.

11. The process according to claim 10 wherein as polar solvents, alcohols, ketones, carboxylic acids, nitrites, amides, esters, alkylsulphoxides are utilized.

* * * * *